United States Patent
Kannan et al.

(10) Patent No.: US 10,515,380 B2
(45) Date of Patent: Dec. 24, 2019

(54) PROACTIVE SURVEYS BASED ON CUSTOMER INFORMATION

(71) Applicant: [24]7.ai, Inc., San Jose, CA (US)

(72) Inventors: Pallipuram V. Kannan, Los Gatos, CA (US); Ravi Vijayaraghavan, Bangalore (IN); Kranthi Mitra Adusumilli, Hyderabad (IN)

(73) Assignee: [24]7.ai, Inc., San Jose, CA (US)

( * ) Notice: Subject to any disclaimer, the term of this patent is extended or adjusted under 35 U.S.C. 154(b) by 194 days.

(21) Appl. No.: 14/080,578

(22) Filed: Nov. 14, 2013

(65) Prior Publication Data

US 2014/0143017 A1 May 22, 2014

Related U.S. Application Data

(60) Provisional application No. 61/727,628, filed on Nov. 16, 2012.

(51) Int. Cl.
*G06Q 30/02* (2012.01)

(52) U.S. Cl.
CPC ................................ *G06Q 30/0203* (2013.01)

(58) Field of Classification Search
None
See application file for complete search history.

(56) References Cited

U.S. PATENT DOCUMENTS

| | | | |
|---|---|---|---|
| 8,600,790 B1 * | 12/2013 | Peacock et al. | 705/7.11 |
| 8,694,358 B2 | 4/2014 | Tryfon et al. | |
| 2002/0091875 A1 * | 7/2002 | Fujiwara | G06Q 30/0251 719/330 |
| 2004/0059624 A1 * | 3/2004 | Wantulok et al. | 705/10 |
| 2004/0193479 A1 | 9/2004 | Hamlin et al. | |
| 2005/0071219 A1 | 3/2005 | Kahlert et al. | |
| 2009/0254531 A1 * | 10/2009 | Walker | G06Q 30/02 |
| 2009/0265224 A1 | 10/2009 | Tarr et al. | |
| 2010/0036720 A1 | 2/2010 | Jain et al. | |
| 2011/0145039 A1 | 6/2011 | McCarney et al. | |
| 2011/0276513 A1 | 11/2011 | Erhart et al. | |
| 2012/0053951 A1 | 3/2012 | Kowalchuk et al. | |
| 2012/0316921 A1 * | 12/2012 | Carsanaro et al. | 705/7.32 |

FOREIGN PATENT DOCUMENTS

| | | |
|---|---|---|
| WO | WO-2001/033831 | 5/2001 |
| WO | 2014028976 A1 | 2/2014 |

OTHER PUBLICATIONS

Zhang, et al. "Identification of factors predicting clickthrough in web searching using neural network analysis" Journal of the American Society for Information Science and Technology, 60(3):557-570, Mar. 2009.

* cited by examiner

*Primary Examiner* — Mehmet Yesildag
(74) *Attorney, Agent, or Firm* — Perkins Coie LLP; Michael A. Glenn

(57) ABSTRACT

A context-aware computing system for delivering surveys to a customer. The choice of which survey to send to a customer may be tailored based on a click path (route), customer history, and customer interests. A customer browsing a Web page initiates the survey decision process. A control module selects a survey to send to a customer based on the criteria above and customer intent. Customer responses are then harvested from the Web-based survey.

8 Claims, 6 Drawing Sheets

PROACTIVE SURVEYS BASED ON CUSTOMER INFORMATION

CROSS REFERENCE TO RELATED APPLICATIONS

This application claims priority to U.S. provisional patent application Ser. No. 61/727,628, filed Nov. 16, 2012, which application is incorporated herein in its entirety by this reference thereto.

BACKGROUND OF THE INVENTION

Technical Field

The invention relates to customer relationship management. More particularly, the invention relates to enhancing the customer experience by providing surveys to customers based on customer information.

Description of the Background Art

Customer relationship management (CRM) systems continue to evolve. Such systems rely on a number of information sources to understand the needs of potential customers. Further, the CRM systems seek approaches to serve those customers better and thus improve revenue streams. Such information gathering may be based on potential customers filling in simple Web forms to provide contact information and to declare areas of interest.

Currently, websites offer customers the choice to take surveys. Such surveys are used to collect information from the customer. The information can comprise personal information about the customer, customer contact information, customer preferences, likes, and dislikes, and so on. The surveys are generic, i.e. the same survey is typically offered to all customers without regard to factors that may be unique to the customer or may distinguish a particular customer from other customers.

There are websites, which offer different surveys to customers, depending on the specific Web page in the website that the customer is currently viewing. However, such surveys are generally hard coded into the Web page, i.e. static and no further modification is made to the survey once it is placed on the website.

SUMMARY OF THE INVENTION

Embodiments of the invention provide a systematic way of identifying potential customer interests and matching appropriate surveys to the customer. The embodiments herein relate to customer relationship management and, more particularly, to enhancing the customer experience by providing such surveys to the customer. The embodiments herein enhance the customer experience by enabling surveys to be sent to a customer in an online environment based upon a plurality of factors comprising, but not limited to, customer journey, customer history, customer interests, and customer preferences.

DETAILED DESCRIPTION OF THE INVENTION

Embodiments of the invention enhance the customer experience by enabling surveys to be sent to a customer in an online environment based on a plurality of factors comprising, but not limited to, customer journey, customer history, customer interests, and customer preferences. When a customer visit's a website, the system knows information related to the customer's previous visits, calls, and other interactions with the system, as well as information such as purchases, etc. This information can be stored in a backend database, as well as in Web storage, such as cookies, or as a combination of both. When a customer visits, the website for the first time, a unique ID is associated with the customer. This unique ID is stored in a cookie, as well as in a backend database. Any further activity is associated with this ID, e.g. in the database or in the cookies. In this manner, data associated with a customer can be fetched when required to make a decision regarding which survey to show to the customer. In embodiments of the invention, the nature of data also includes all possible interactions, along with Web data, which is in contrast with present practice which concerns either single channel data or CRM data, which is usually used for other decision making, i.e. non-survey related.

In some embodiments of the invention, unique customer identification and behavior between either concurrent or sequential channels of engagement and different devices is linked, as set forth in copending, commonly assigned U.S. patent application Ser. No. 13/897,233, filed May 17, 2013, which application is incorporated herein in its entirety by this reference thereto. Linkages are created across channels and devices within the same session, as well as across sessions. These links can be made probabilistically, based on machine learning and statistical models driven by behavior and other attributes of customer journeys. Unique identifiers are created, captured, and/or passed between these multiple contact channels, e.g. Web, mobile, interactive voice response (IVR), phone, automotive, television, to identify and tag the customer and their context, e.g. history, past behavior, steps progressed, obstacles and/or issues encountered, etc., uniquely.

Figure 1:
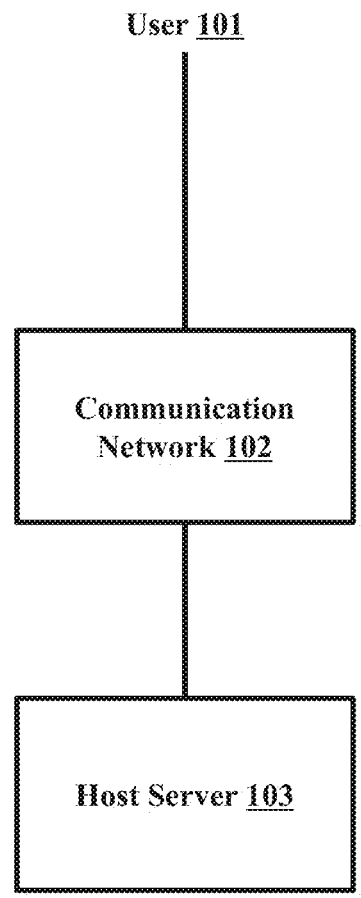
FIG. 1 is a block schematic diagram that shows a system with which a customer contacts a host server.

FIG. 1 is a block schematic diagram that shows a system with which a customer contacts a host server which hosts the website contacted by the customer and that then provides the requested webpage to the customer, according to the invention. The system in this embodiment of the invention comprises a communication network 102 and a Web server 103. The communication network 102 may be a cellular based communication network, in which a customer 101 operates a device to access the communication network 102. The device may be a mobile phone, a handheld device, a tablet, a computer, or any other device capable of communicating with the communication network. The communication network may use any suitable communication technology to communicate with the customer via the device.

During operation of an embodiment of the invention, the customer sends a request to the host server using the communication network, e.g. the request may be for access to a specific Web page that is present on the host server. The host server serves the customer with the requested Web page using the communication network.

Embodiments of the invention provide a Web server or other system that determines customer intent and identifies an appropriate survey to be provided to the customer, for example based upon such intent. An administrative console provides a mechanism with which an authorized person, such as an administrator of the Web page, can enter information, such as one or more surveys, the corresponding conditions under which each of the surveys may be sent to the customers, and the customers to which each of the surveys have to be sent. Corresponding conditions refer to either identification of a specific intent of a customer or, in absence of a dominant intent, probabilities of intent being the true intent that are associated with possible intents. The criteria that are based on which specific survey is associated with a customer (weightage selection) are also part of the corresponding conditions.

Figure 2:
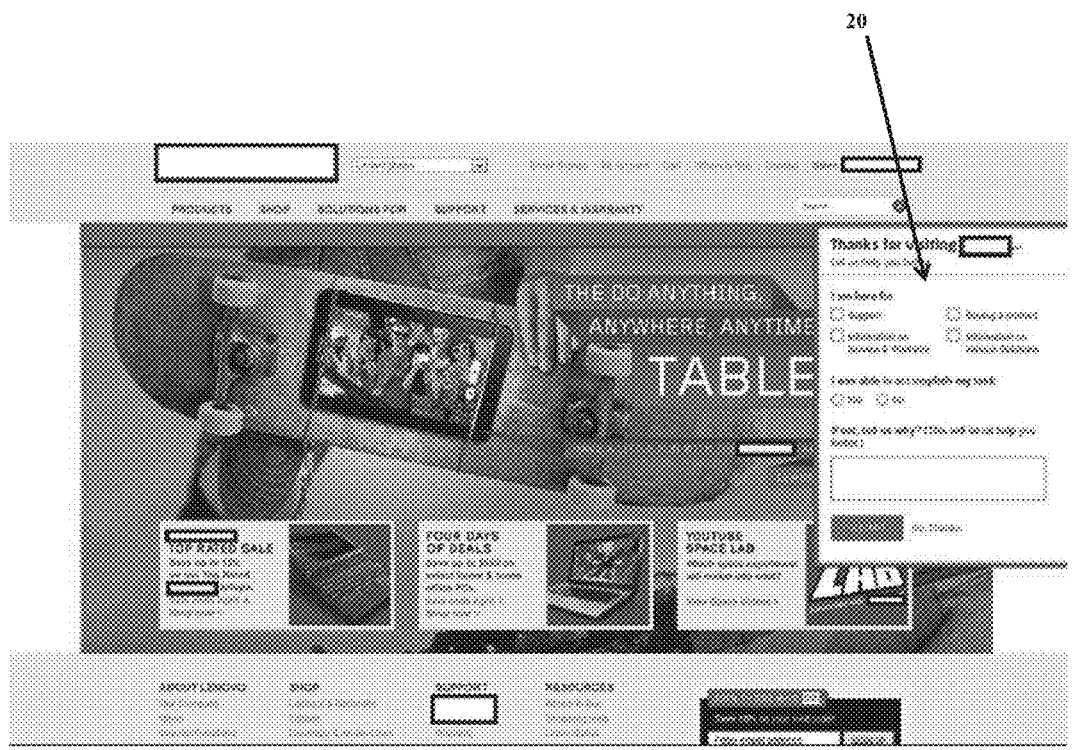
FIG. 2 is a screen shot showing a customer survey according to the invention.

The administrative console is an Interface via which different inputs are provided to the system. The inputs include mapping of intents with different surveys, the weightage criteria and survey design. Survey design is essentially the choosing of how the survey looks, what are the questions and what are the options provided to answer the same. In an embodiment of the invention, the design is selected from a library of designs provided, or it can be a new design which can be uploaded to the system. Questions and options are text to be entered, which are formatted as per the selected design. FIG. 2 is a screen shot showing a customer survey 20 according to the invention.

The Web server also determines if there is a survey to be sent to the customer. In addition to identifying if a survey is to be sent to a specific customer using information that is unique to the customer and other information, the Web server also checks for conditions required for sending the survey, such as sending the survey to all customers accessing the Web page, to every $n^{th}$ customer accessing the Web page, to all customers who are accessing the Web page for the first time, to customers who have accessed the Web page at least n times, and so on. The conditions may be set by an authorized person, such as an administrator of the Web page, and so on.

As noted above, the Web server also checks the information related to the customer. The information may comprise the customer journey, customer history, customer interests, and customer preferences. The customer journey refers to other Web pages visited by the customer before visiting a particular Web page, and the path taken by the customer to reach the current Web page, such as by clicking on a result in a search page, a link in the home page, a link present on an external site, and so on.

Figure 3:
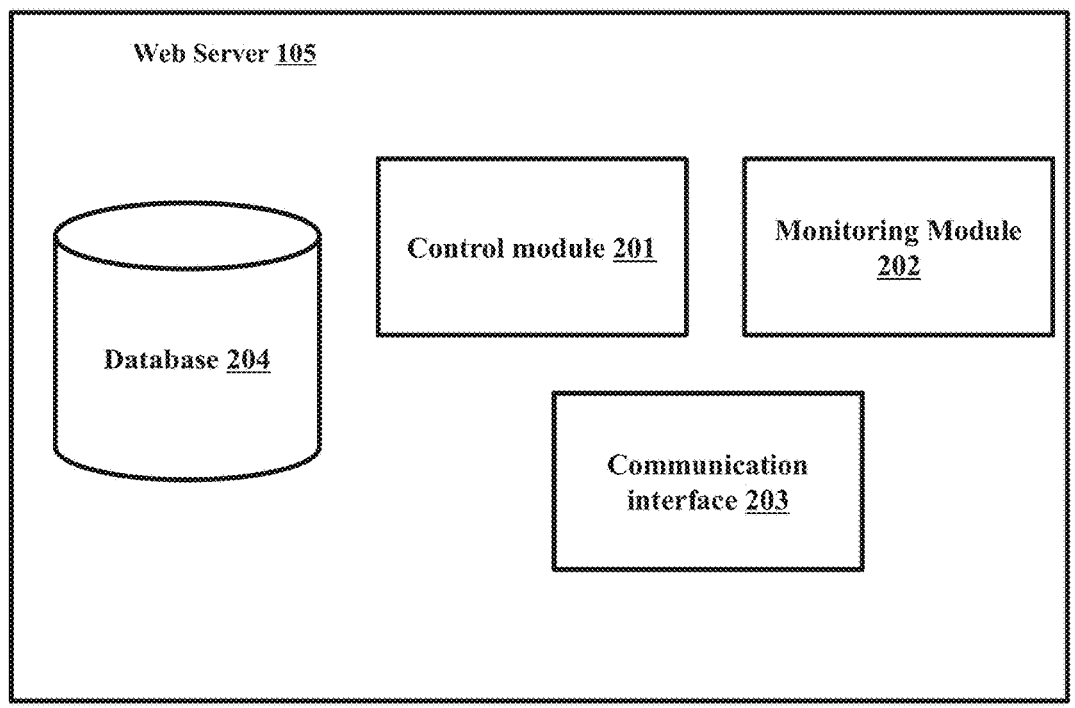
FIG. 3 is a block schematic diagram that shows a Web server according to the invention.

Based on the information related to the customer, the Web server fetches an appropriate survey and sends the survey to the customer (see FIG. 2). The customer may also be provided with an option to decide whether or not to take the survey. If the customer opts to take the survey, the answers and responses of the customer are received by the Web server. The Web server stores the answers and responses from the customer in a suitable location, FIG. 3 is a block schematic diagram that shows a Web server according to the invention. In an embodiment of the invention, the Web server 105 comprises a control module 201, a monitoring module 202, a communication interface 203, and a database 204. Those skilled in the art will appreciate that the invention herein may be provided with other modules.

In embodiments of the invention, the database is present on the Web server. The database may also be co-located with the Web server. In another embodiment of the invention, the database may be located remotely from the Web server and connected to the Web server via any known technique.

The control module enables an admin console that provides a mechanism with which an authorized person, such as an administrator of the Web page, can enter information via the communication interface, such as surveys, the corresponding conditions under which each of the surveys have to be served to the customers, and the customers to whom each of the surveys are to be served.

The control module also uses the monitoring module to check if there is a survey to be sent to the customer. The control module checks for conditions attached to sending the survey, such as sending the survey to all customers accessing the Web page, to every $n^{th}$ customer accessing the Web page, to all customers who are accessing the Web page for the first time, to customers who have accessed the Web page at least n times, and so on. The control module also enables the conditions to be set by an authorized person, such as an administrator of the Web page, and so on.

The control module checks the information related to the customer with the help of the monitoring module to determine customer intent and to check for an appropriate survey. The information provided by the monitoring module may comprise, for example, the customer journey, customer history, customer interests, and preferences as set by the customer. The journey of the customer refers to Web pages that were visited by the customer before visiting the current Web page, and the path taken by the customer to reach the current Web page, such as by clicking on a result in a search page, a link in the home page, a link present on an external site, and so on.

Based on the information related to the customer received from the monitoring module, the control module fetches an appropriate survey and sends the survey to the customer.

Method to Associate Data with a Customer

When a customer visit's the website, the system knows information related to the customer's previous visits, calls, and other interactions with the system, as well as information, such as purchases, etc. This information can be stored in a back end database, as well as in Web storage, such as cookies or as a combination of both.

When a customer visits the website for the first time, a unique ID is associated with the customer. This unique ID is stored in a cookie, as well in a back end database. Any further activity is associated with this ID in the database or in the cookies. In this manner, data associated with a customer can be fetched when required to make decision regarding which survey to show to the customer. Uniquely, the nature of data includes substantially all possible interactions along with Web data, which is in contrast with present practice where either single channel data or CRM data is usually used for other decision making, i.e. non-survey related.

Method for Selection of a Proactive Survey

A primary goal of a proactive survey based on customer interaction information is to improve the customer experience and, in turn, the survey response rate. When the appropriate context is present in the survey, which is in line with the customer intent, the response rate is higher. In turn, this translates into offering a survey that is closest to the intent of the customer, as well as offering the survey proactively at the right time.

For the above, intent prediction and channel affinity predictions based on various machine learning and statistical models can be used. These help to identify the intent of the customer, as well as the right time to offer, e.g. chat. Note that most likely intent is usually identified. However, in certain cases a score with regard to each intent can be used in a weighted fashion to choose the right survey.

Surveys are designed with particular purpose in mind. Also, customers come to website with particular intent in mind. To offer the appropriate survey, each of the different surveys designed is associated with one of the intents to be predicted. Either the survey associated with the most likely intent is shown to the customer or it is based upon weighing using the probability of each specific intent as weight for respective surveys, such that the survey with maximum weight is selected.

It is possible that in certain cases none of the specifically designed surveys is appropriate for certain intents. In these cases, either a default survey can be associated with the intents or no survey is shown to the customers.

EXAMPLES

For example, if the intent of the customer is predicted to be price sensitive shopping, then an appropriate survey asking questions related to price discounts and product information is proactively displayed to the customer.

If the customer opts to take the survey, the answers and responses of the customer are received by the control module via the communication interface. The control module stores the answers and responses from the customer in the database and/or any other suitable location.

Figure 4:
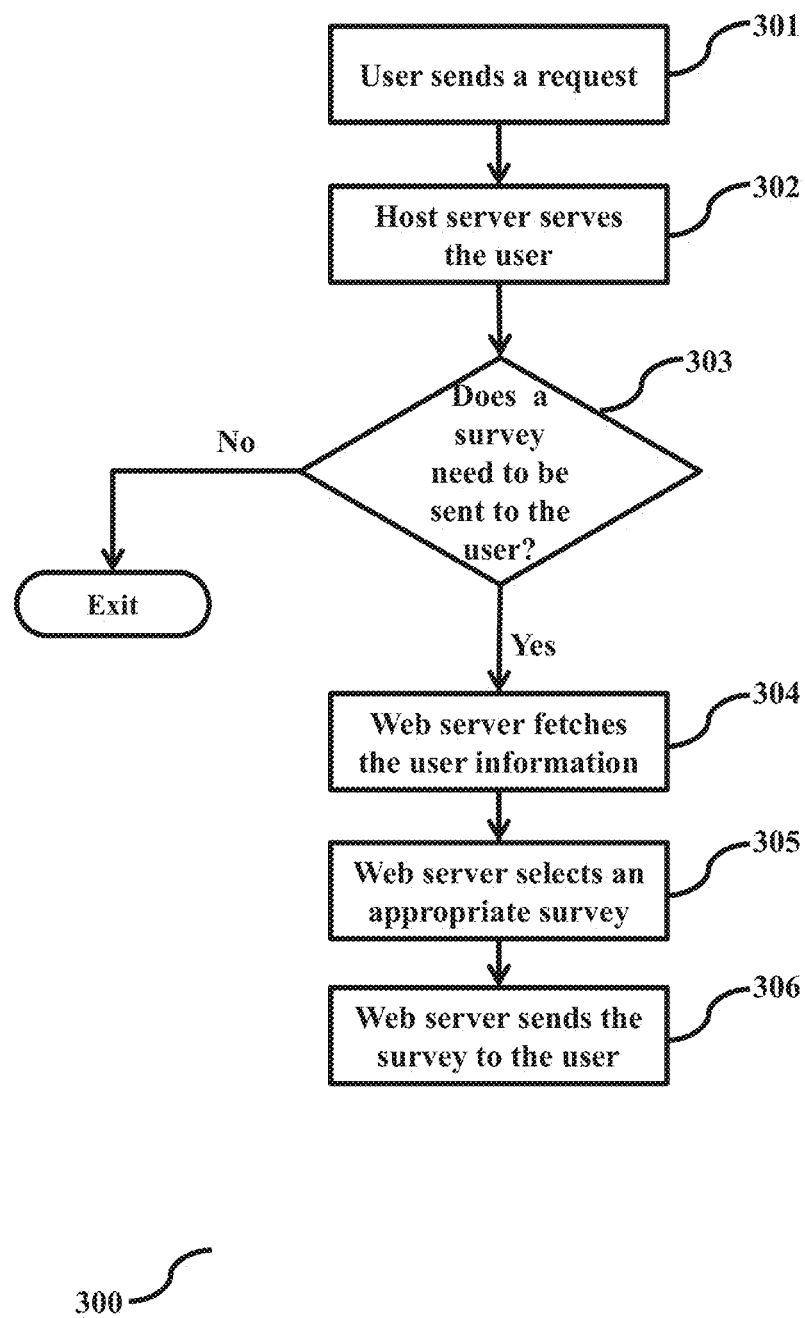
FIG. 4 is a flowchart that shows a process of sending surveys to a customer according to the invention.

FIG. 4 is a flowchart that shows a process (300) of sending surveys to a customer according to the invention. The customer sends (301) a request to the host server using the communication network. The request may be, for example, to access a specific Web page that is present on the host server. The host server serves (302) the customer with the requested Web page using the communication network. The Web server monitoring the customer interaction with the website, determines (303) if there is a survey to be sent to the customer.

The Web server may check for conditions attached to sending the survey, such as sending the survey to all customers accessing the Web page, to every nth customer accessing the Web page, to all customers who are accessing the Web page for the first time, to customers who have accessed the Web page at least n times, and so on. In this regard, an appropriate randomization, design of experiments strategy (DOE), or other similar methods can be used. Additionally, DOE can be used for sending different surveys to customers who have the same intent.

If a survey is to be sent to the customer, the Web server checks (304) the information related to the customer. The information may comprise, for example, the customer journey, customer history, customer interests, and preferences as set by the customer. The customer journey refers to the Web pages that were visited by the customer before the customer visited the current Web page, and the path taken by the customer to reach the current, Web page, such as by clicking on a result in a search page, a link in the home page, a link present on an external site, and so on. Based on the information related to the customer, the Web server fetches (305) an appropriate survey and sends (306) the survey to the customer. The various actions in method (300) may be performed in the order presented, in a different order or simultaneously. Further, in some embodiments, some actions listed in FIG. 4 may be omitted. The customer experience is thus improved because the survey shown to the customer is identified based upon the customer's intent and, therefore, provides the customer with a greater sense of continuity and association and, hence, a better overall experience. This further results in improved survey response rates. Those skilled in the art will appreciate that survey results may also be applied to further analysis as desired.

Selection of a Proactive Survey

Embodiments of the invention provide proactive customer surveys. One goal of a proactive survey based on customer interaction information is to improve the customer experience and, in turn, the survey response rate. When the appropriate context is present in the survey which is in line with the customer's intent, the response rate is higher. In turn, this translates to offering surveys that are closest to the intent of the customer, as well as offering the survey proactively. See copending, commonly-assigned U.S. patent application Ser. No. 13/852,942, filed Mar. 28, 2013, the entirety of which is incorporated herein by this reference thereto, which provides a method and apparatus that enables identification of customer characteristics and behavior, and that predicts the customer's intent. Such prediction can be used to adopt various business strategies dynamically to increase the chances of conversion of customer interaction to a sale, and thereby increase revenue, and/or enhance the customer's experience.

To this end, intent prediction and channel affinity predictions based on various machine learning and statistical models, such as Logistic Regression, Naïve Bayes, SVN, and other such classifiers and other non-parametric techniques, such as KNN, can be used to help identify the intent of the customer, as well as the right time to offer services to the customer, e.g. a survey. Note that most likely intent is usually identified. However, in certain cases a score with regard to each intent can be used in a weighted fashion to choose the right survey.

Each model mentioned above provides a score, e.g. the probability of a particular intent. The score is determined by the models. Weighting can be accomplished by any generic form of weighting. For illustration, the following is an example of the mapping entered through the admin console, in which linear weighting is considered:

Intent Mapping
  Intent: Survey
  I1→S1
  I2→S2
  I3→S1
  p1, p2, p3 be score associated with the three intents above, i.e. I1, I2, and I3.

$$\text{The survey shown} = S1 \text{ if } p1 + p3 > p2;$$
$$= S2 \text{ otherwise}$$

Essentially, the associated survey which gets the maximum sum of scores is shown.

Surveys are designed with a particular purpose in mind, for example to collect information about price sensitivity associated with a particular product, information regarding customer experience of the website, information regarding specific intent of browsing, such as gathering information, buying a product, looking at deals, etc. Also, customers come to a website with particular intent in mind. For example, if the intent of the customer is predicted to be price sensitive shopping, then an appropriate survey asking questions related to price discounts and product information can be proactively displayed to the customer.

To offer the appropriate survey, each of the different surveys designed is associated with one of the intents to be predicted. For example, such intents can comprises any of browsing for a specific product information; browsing for deals on specific product; simple browsing without intent of purchase; intent of purchasing a specific product in immediate future; intent of purchasing a product for a specific need in immediate future; trying to gather information to solve a specific service related problem or problem associated with a specific product problem; etc.

Either the survey associated with the most likely intent is shown to the customer or, based weighing using the probability of each specific intent as weight for respective surveys, the survey with maximum weight is selected. It is possible that in certain cases none of the specifically designed surveys is appropriate for certain intents. In these cases, either a default survey can be associated with the intents or a survey is not shown to the customer. In embodiments of the invention, an administrator, such as the administrator of the website, designs a default survey appropriate for the website. A survey can be designed using any standard survey design methodologies and tools, using a tool provided as part of the system, or in the manner explained above. A survey may be designed outside of the system using standard techniques and then uploaded to the system. A default survey can also be generated using known techniques. This default survey is associated with all intents not specifically assigned to a particular customer.

Figure 5:
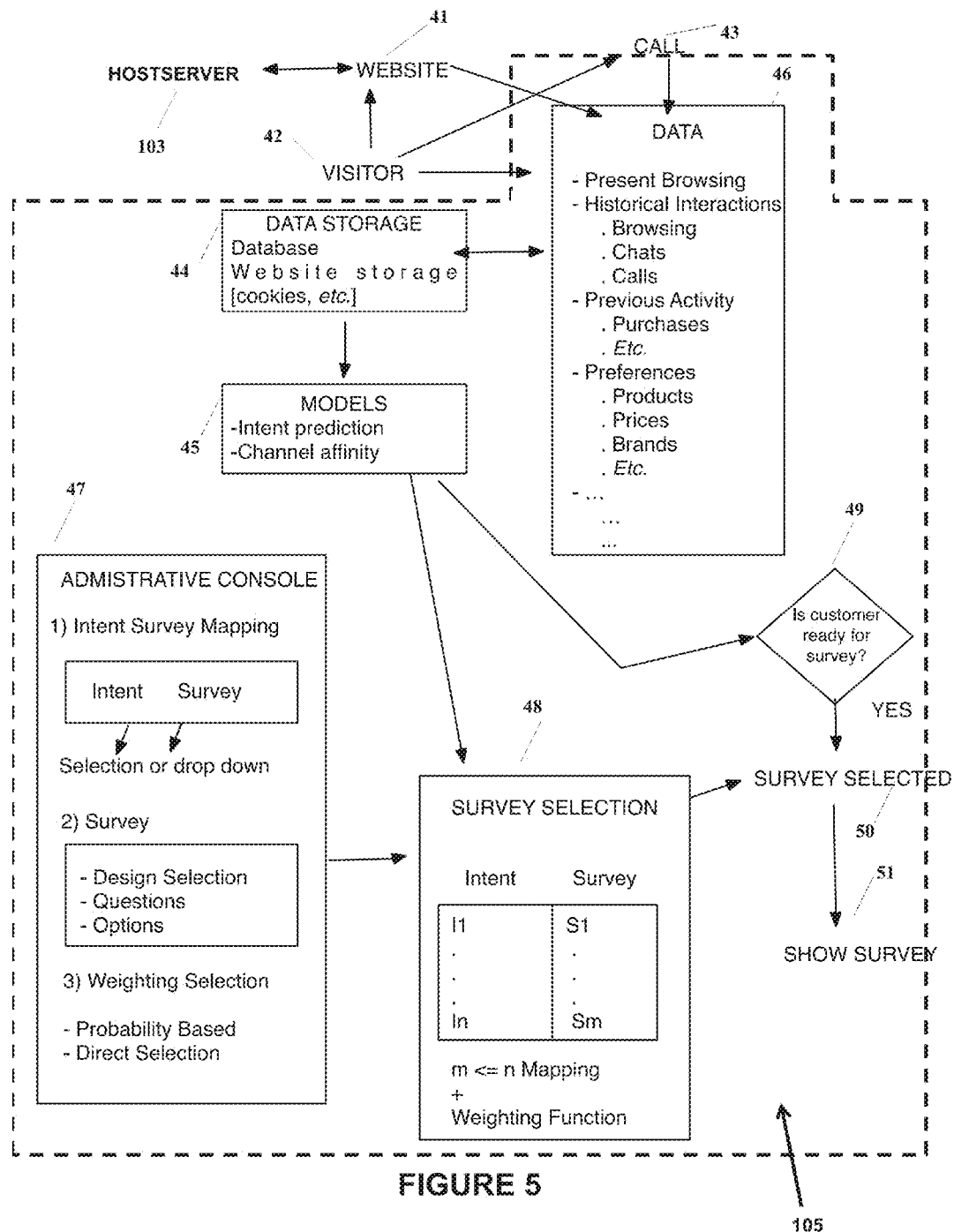
FIG. 5 is a block schematic diagram that shows an overall architecture for proactively surveying a customer based upon customer intent predictions according to the invention.

FIG. 5 is a block schematic diagram that shows an overall architecture for proactively surveying a customer based upon customer intent predictions according to the invention. In FIG. 5, a customer 42 views a Web page on a website 41 that is provided by a host server 103. The customer may also be accessing a customer service center, for example via a telephone call 43.

Information regarding the website, the call (if applicable), and the customer is collected 46 and stored in, and retrieved from, a data storage medium 46, which comprises, for example, a database, website storage for cookies, etc. This data includes, for example, present customer browsing activities; historical customer interactions, such as browsing, chats, and calls; previous activity, such as purchases, etc.; preferences, such a product, price, brand, and other preferences; etc.

The data that is collected and that populates the data storage medium is used in various models 45 for customer intent prediction and to determine customer channel affinity. As discussed above, intent prediction involves predicting the likely intent of the customer based on the information available using various predictive models. For prediction, the list of intent listed in the intent-survey mapping is considered. Examples of intent have been provided elsewhere. In an embodiment of the invention, a modeling engine categorizes the customer into one or more predefined groups of customers by evaluating the customer behavior with respect to previous population of customers in the relevant groups identified and predicts intent, based on plurality of factors comprise, for example, locations of the customers, time of visit, referral page, landing and/or exit pages, customer interaction information, past interaction history, and so on.

Channel affinity is the propensity of the customer to be more prone to interact with a specific channel. This propensity is estimated based on predictive models. The models are evaluated via a modeling engine based on the data from different data stores. Such evaluation engine can run the customer device or on the webserver. The modeling engine determines the appropriate time to trigger the engagement strategy, based on a plurality of factors comprising, but not limited to, the time and/or time range that the customer spends on a Web page in the domain. For example, the modeling engine may select a suitable page in the navigation path and time delay on the particular page for triggering the appropriate survey so that the customer is likely to respond to the survey and, consequently, this leads to better customer experience and data collection (response). The modeling engine may also select more than one engagement strategy. The engagement strategy could be any of, but not limited to, email based survey, proactive survey on the website, survey via call.

As set forth above, both the prediction score and, hence, predictions keep changing and evolve as the customer journey unfolds. Customers more prone to respond via a website survey are provided survey on the website, while customers who can respond via email are provided the same.

Based upon such models, a determination is made whether or not the customer (customer) is ready for a survey 49. As the customer journey progresses, at each instance the intent and the probability of the customer responding to a survey are calculated. Once the probability of responding crosses a particular threshold; which can be set by the administrator; the appropriate survey is shown. Which survey is shown depends on the probabilities of each intent, along with the survey intent mapping. If a survey is to be presented to the customer, a survey selection module 48, based upon model provided information, maps customer intent to the various types of survey that are available and/or applies a weighting function. As a result, a survey is selected 50 and presented to the customer 51.

An administrative console 47 is provided that allows an administrator to perform a mapping between the customer's intent and the nature of the survey, for example via selection or from a drop down menu, that is then applied when a survey is presented to a customer. In this way, the survey is matched to the customer's intent.

The administrative console allows survey design selection, questions to be presented, and other options. The administrative console also allows weighting selection, which can be any of a probability based selection or a direct selection.

Various elements discussed above in connection with FIG. 5 are shown on FIG. 5 as part of the Web site 105. Those skilled in the art will appreciate that these various elements of the invention can be distributed across an overall architecture and need not be established within a common server.

Computer Implementation

Figure 6:
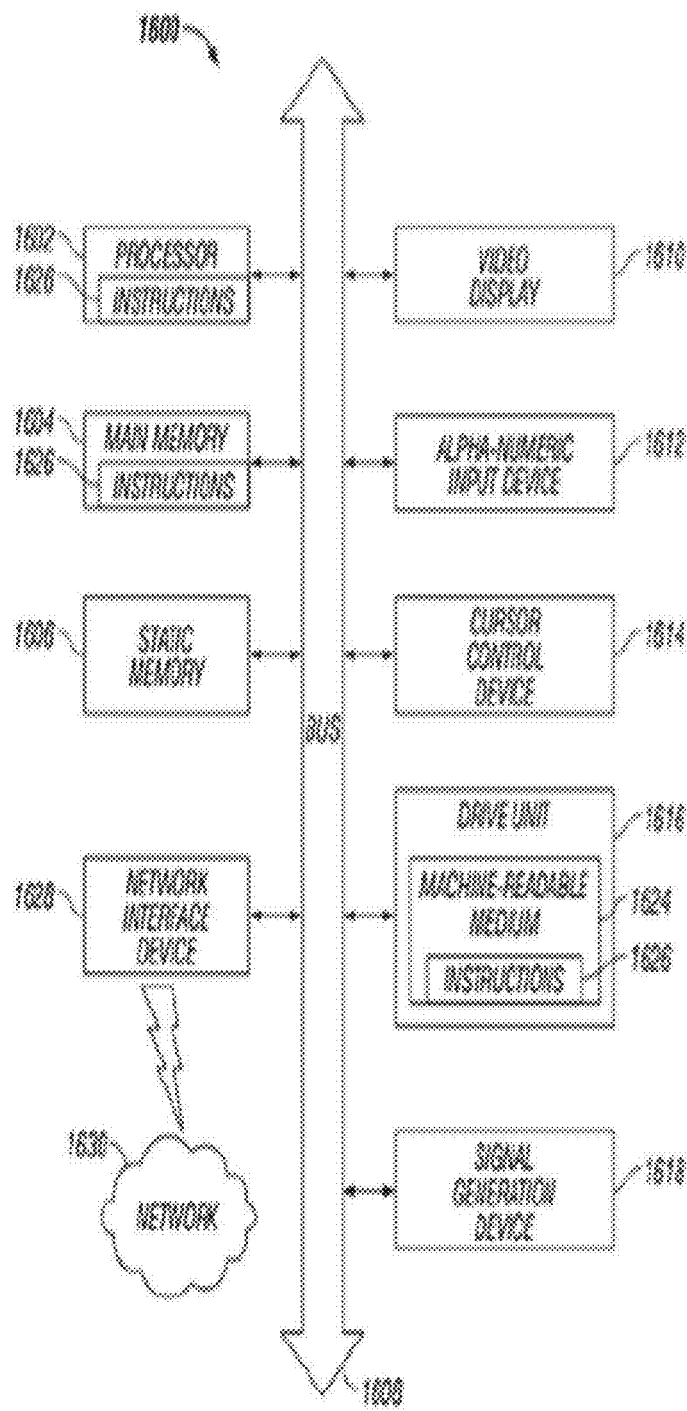
FIG. 6 is a block schematic diagram that shows a machine in the exemplary form of a computer system within which a set of instructions for causing the machine to perform any of the herein disclosed methodologies may be executed.

FIG. 6 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC). Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, the embodiments disclosed herein can be implemented through at least one software program running on at least one hardware device and performing network management functions to control the network elements.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for automatically generating a customized survey design, comprising:
    obtaining any of machine learning and statistical models that predict a customer intent as a function of customer data,
        wherein said machine learning and statistical models are trained to identify associations between customer data and a pre-defined list of possible customer intents including any of browsing for specific product information, browsing for deals on a specific product, simple browsing without intent of purchase, intent of purchasing a specific product in immediate future, intent of purchasing a product for a specific need in immediate future, trying to gather information to solve a specific service related problem or a problem associated with a specific product;
    obtaining customer data having a record of a plurality of web page activities associated with a customer device, wherein the plurality of web page activities include any of a time of a web page visit associated with the customer device, a referral web page, landing and/or exit web pages, detected interaction with a web page, and interaction history with a web page;
    in connection with receiving and fulfilling a request for Web-based information, from a customer device, a processor applying any of the machine learning and the statistical models to predict a customer intent based on the customer data;
    said processor identifying an ordered sequence of inputs in the customer data associated with a web browsing history through a plurality of web pages by the customer device and interaction history with the plurality of web pages;
    applying, by said processor, the predicted customer intent and the ordered sequence of inputs to proactively determine whether a customized survey is to be delivered to said customer device by:
        additional web browsing history and interaction history is detected, at each instance said processor calculating the predicted customer intent and a probability of receiving a survey response;
            when the probability of receiving the survey response crosses a predetermined threshold, said processor generating a customized survey design based on the predicted customer intent, the customized survey design including at least one question among a plurality of questions, at least one option to answer the at least one question, and an appearance selected from a design library corresponding to the predicted customer intent,
    wherein generating the customized survey design comprises a survey selection module, based upon model provided information, mapping the predicted customer intent to at least one available question among a plurality of available questions and/or applying a weighting function to select at least one available question among the plurality of available questions, the at least one available question being incorporated in the customized survey design; and
    said processor delivering a survey including the customized survey design to the customer device.

2. The method of claim 1, further comprising:
said processor checking for conditions required for delivering the survey, wherein said conditions comprise any of:
    sending the survey to all customers accessing a particular Web page;
    sending the survey to every nth customer accessing the particular Web page;
    sending the survey to all customers who are accessing the particular Web page for the first time; and
    sending the survey to customers who have accessed the particular Web page at least n times.

3. The method of claim 1, further comprising:
said processor checking for information related to said customer, wherein said information comprises any of:

a customer journey comprising other Web pages visited by the customer before visiting a particular Web page and a path taken by the customer to reach the particular Web page;
customer history;
customer interests; and
customer preferences.

4. The method of claim 1, further comprising:
said processor providing said customer with an option to decide whether or not to take the survey.

5. An apparatus for automatically generating a customized survey design, comprising:
a communication interface;
a database;
a control module configured for:
obtaining any of machine learning and statistical models that predict a customer intent as a function of customer data,
wherein said machine learning and statistical models are trained to identify associations between customer data and a pre-defined list of possible customer intents including any of browsing for specific product information, browsing for deals on a specific product, simple browsing without intent of purchase, intent of purchasing a specific product in immediate future, intent of purchasing a product for a specific need in immediate future, trying to gather information to solve a specific service related problem or a problem associated with a specific product;
receiving a customer request for Web-based information via said communication interface;
in response to receiving the customer request, obtaining customer data having a record of a plurality of web page activities associated with a customer device,
wherein the plurality of web page activities include any of a time of a web page visit associated with the customer device, a referral web page, landing and/or exit web pages, detected interaction with a web page, and interaction history with a web page;
applying any of machine learning and statistical models to predict a customer intent based on the customer data;
wherein said machine learning and statistical models are trained to identify associations between customer data and a pre-defined list of possible customer intents including any of browsing for specific product information, browsing for deals on a specific product, simple browsing without intent of purchase, intent of purchasing a specific product in immediate future, intent of purchasing a product for a specific need in immediate future, trying to gather information to solve a specific service related problem or a problem associated with a specific product;
identifying an ordered sequence of inputs in the customer data associated with a web browsing history through a plurality of web pages by a customer device and interaction history with the plurality of web pages;
using said predicted customer intent and said ordered sequence of inputs to proactively determine whether a customized survey is to be delivered to said customer device by:

as additional web browsing history and interaction history is detected, at each instance said control module calculating the predicted customer intent and a probability of receiving a survey response;
when the probability of receiving the survey response crosses a predetermined threshold, said control module generating a customized survey design based on the predicted customer intent, the customized survey design including at least one question among a plurality of questions, at least one option to answer the at least one question, and an appearance selected from a design library corresponding to the predicted customer intent,
a monitoring module configured for, when a survey is to be presented to the customer, based upon model provided information, mapping the predicted customer intent to at least one available question among a plurality of available questions and/or applying a weighting function to select at least one available question among the plurality of available questions, the at least one available question being incorporated in the customized survey design;
said control module further configured for:
delivering a survey including the customized survey design to the customer device via the communication interface;
receiving customer survey answers and responses from said customer device via said communication interface; and
storing the survey answers and responses from said customer in said database.

6. The apparatus of claim 5, said control module further comprising:
a mechanism with which an authorized person enters information via the communication interface, said entered information comprising any of one or more surveys, corresponding conditions under which each of said surveys have to be served to a customer, and customers to whom each of said surveys are to be served.

7. The apparatus of claim 5, said control module further configured for:
checking for conditions attached to sending the survey, wherein said conditions comprise sending the survey to any of:
all customers accessing a Web-based resource;
every nth customer accessing the Web-based resource;
all customers who are accessing the Web-based resource for the first time; and
customers who have accessed the Web-based resource at least n times.

8. The apparatus of claim 5, wherein information provided by said monitoring module comprises any of:
a customer journey comprising other Web pages visited by the customer before visiting a particular Web page and a path taken by the customer to reach the particular Web page, wherein said customer journey comprises any of a virtual journey, a literal journey, or a combination of a virtual journey and a literal journey;
customer history;
customer interests; and
preferences as set by the customer.

* * * * *